(12) United States Patent
Suddaby (10) Patent No.: US 11,674,503 B2
(45) Date of Patent: Jun. 13, 2023

(54) VARIABLE MASS, VARIABLE RADIUS FLYWHEEL ASSEMBLY

(71) Applicant: Loubert S. Suddaby, Orchard Park, NY (US)

(72) Inventor: Loubert S. Suddaby, Orchard Park, NY (US)

( * ) Notice: Subject to any disclaimer, the term of this patent is extended or adjusted under 35 U.S.C. 154(b) by 159 days.

(21) Appl. No.: 17/337,555

(22) Filed: Jun. 3, 2021

(65) Prior Publication Data

US 2022/0389915 A1  Dec. 8, 2022

(51) Int. Cl.
*F03G 3/08* (2006.01)
*F16F 15/31* (2006.01)

(52) U.S. Cl.
CPC ............ *F03G 3/08* (2013.01); *F16F 15/31* (2013.01)

(58) Field of Classification Search
CPC ...... F16F 15/31; F16F 15/1471; F16F 15/315; F16F 15/363; F16F 15/30; F03G 3/08; D06F 37/245; H02K 7/02
See application file for complete search history.

(56) References Cited

U.S. PATENT DOCUMENTS

| | | |
|---|---|---|
| 1,706,678 A | 3/1929 | Pangburn |
| 4,725,766 A | 2/1988 | Pinson |
| 4,926,107 A | 5/1990 | Pinson |
| 4,995,282 A | 2/1991 | Schumacher |
| 7,004,294 B2 | 2/2006 | Williams |
| 7,044,022 B2 | 5/2006 | Kim |
| 2005/0188783 A1* | 9/2005 | Stanimirovic .......... F16F 15/31 74/574.2 |
| 2009/0320640 A1* | 12/2009 | Elliott ...................... F03G 3/08 74/572.21 |
| 2010/0199803 A1* | 8/2010 | Achiriloaie ............... F03G 3/08 74/574.2 |

FOREIGN PATENT DOCUMENTS

| | | | | |
|---|---|---|---|---|
| CH | 624247 A | * | 7/1981 | ............ F03B 15/08 |
| EP | 0508790 A1 | | 4/1992 | |
| KR | 2011013098 A | * | 2/2011 | ............ F16F 15/31 |
| WO | WO/1998/51942 A1 | | 11/1998 | |

* cited by examiner

*Primary Examiner* — Thomas C Diaz
(74) *Attorney, Agent, or Firm* — Harter Secrest & Emery LLP; Michael Nicholas Vranjes (57) ABSTRACT

A flywheel assembly, including a cylinder including a first end and a second end, a first piston non-rotatably connected to the cylinder, the first piston being slidably engaged in the cylinder proximate the first end, a first biasing element operatively arranged in the cylinder to bias the first piston in a first axial direction, a first arm non-rotatably connected to the first piston, a second arm non-rotatably connected to the first piston, a first mass connected to the first arm, and a second mass connected to the second arm.

20 Claims, 8 Drawing Sheets

VARIABLE MASS, VARIABLE RADIUS FLYWHEEL ASSEMBLY

FIELD

The present disclosure relates to flywheels, and more particularly, to a flywheel assembly capable of varying its overall radius and the distribution of mass along such radius.

BACKGROUND

A flywheel is a mechanical device specifically designed to use the conservation of angular momentum so as to efficiently store rotational energy; a form of kinetic energy proportional to the product of its moment of inertia and the square of its rotational speed. In one example, a flywheel is a heavy rotating wheel attached to a revolving shaft that smooths out the delivery of power of a reciprocating engine due to the difference between the driving torque and the active torque over the cycle of operation. Essentially, a flywheel is a mechanical device specifically designed to store rotational energy. It acts as a reservoir, meaning it stores energy when the supply of the energy is more than that is required for the operation and releases the same when the supply is less than the requirement. Put another way, a flywheel stores the excess of rotational energy for intermittent use. It provides continuous energy when the energy source is discontinuous. In automobile engines, it stores energy to help the engine over idle strokes of the piston. It's often called as a flex plate when connected to automatic transmission. However, current flywheel designs do not allow its radius or weight distribution to be varied in order to maintain an optimal revolutions per minute (RPM).

Thus, there is a long felt need for a flywheel assembly in which the radius thereof and weight distribution therein can be varied and controlled in order to maintain an optimal RPM.

SUMMARY

According to aspects illustrated herein, there is provided a flywheel assembly, comprising a cylinder including a first end and a second end, a first piston non-rotatably connected to the cylinder, the first piston being slidably engaged in the cylinder proximate the first end, a first biasing element operatively arranged in the cylinder to bias the first piston in a first axial direction, a first arm non-rotatably connected to the first piston, a second arm non-rotatably connected to the first piston, a first mass connected to the first arm, and a second mass connected to the second arm.

In some embodiments, the first arm and the second arm are pivotably connected to the first piston. In some embodiments, the first arm is pivotably connected to the first mass and the second arm is pivotably connected to the second mass. In some embodiments, as the first mass and the second mass are displaced radially outward, the first piston displaces in a second axial direction, opposite the first axial direction. In some embodiments, the first biasing element is a spring. In some embodiments, the first biasing element is gas, the gas being pressurized within the cylinder by the first piston. In some embodiments, the flywheel assembly further comprises a first clutch operatively arranged to lock the first piston with respect to the cylinder. In some embodiments, the flywheel assembly further comprises a second piston non-rotatably connected to the cylinder, the second piston being slidably engaged in the cylinder proximate the second end, a second biasing element operatively arranged in the cylinder to bias the second piston in a second axial direction, opposite the first axial direction, a third arm non-rotatably connected to the second piston, the third arm connected to first mass, and a fourth arm non-rotatably connected to the second piston, the fourth arm connected to the second mass. In some embodiments, at least one of the first arm and the second arm comprises a displaceable mass therein. In some embodiments, the at least one of the first arm and the second arm comprises a valve operatively arranged to regulate the movement of the displaceable mass. In some embodiments, the displaceable mass is a liquid. In some embodiments, the displaceable mass is a plurality of solid balls.

According to aspects illustrated herein, there is provided a flywheel assembly, comprising a cylinder including a first end and a second end, a first piston non-rotatably connected to the cylinder, the first piston being slidably engaged in the cylinder proximate the first end, a second piston non-rotatably connected to the cylinder, the second piston being slidably engaged in the cylinder proximate the second end, a first biasing element operatively arranged in the cylinder to bias the first piston in a first axial direction, a second biasing element operatively arranged in the cylinder to bias the second piston in a second axial direction, opposite the first axial direction, a first arm non-rotatably connected to the first piston and the first mass, a second arm non-rotatably connected to the first piston and the second mass, a third arm non-rotatably connected to the second piston and the first mass, and a fourth arm non-rotatably connected to the second piston and the second mass.

In some embodiments, the first arm and the second arm are pivotably connected to the first piston, and the third arm and the fourth arm are pivotably connected to the second piston. In some embodiments, as the first mass and the second mass are displaced radially outward, the first piston displaces in the second axial direction and the second piston displaces in the first axial direction. In some embodiments, at least one of the first biasing element and the second biasing element comprises at least one spring. In some embodiments, at least one of the first biasing element and the second biasing element is gas, the gas being pressurized within the cylinder. In some embodiments, the flywheel assembly further comprises at least one clutch operatively arranged to lock at least one of the first piston and the second piston with respect to the cylinder. In some embodiments, at least one of the third arm and the fourth arm comprises a tube, a displaceable mass arranged in the tube, and a valve operatively arranged in the tube to regulate the movement of the displaceable mass. In some embodiments, the displaceable mass is selected from the group consisting of a liquid and a plurality of solid balls.

According to aspects illustrated herein, there is provided a variable radius/mass flywheel. The flywheel comprises a main tube including a spring and/or compressed gas contained therein. The main tube has two electronic clutch collars, top and bottom, arranged at opposite ends of the tube, operatively arranged to be pushed or biased in the opposite directions by the spring and/or compressed gas. Each electronic clutch collar has two hinges or pivot connections arranged on its radially outward face (e.g., 180° from each other). Each of the top and bottom hinge/pivot connections are engaged to at least one arm or tube, each arm is hingedly or pivotably connected to a mass. Both arms comprise an electronic valve that controls tungsten balls or mercury therein. By opening the electronic valve, the tungsten balls or mercury may move to the mass end of the arms, redistributing the mass of the flywheel when in motion. The radius of the flywheel can also be altered by movement of the clutch collars. The clutch collars are arranged to be locked to the main tube to maintain a radius.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

By "non-rotatably connected" elements, we mean that: the elements are connected so that whenever one of the elements rotate, all the elements rotate; and, relative rotation between the elements is not possible. Radial and/or axial movement of non-rotatably connected elements with respect to each other is possible, but not required. By "rotatably connected" elements, we mean that: the elements are rotatable with respect to each other; and, whenever one element is displaced radially and/or axially, all the elements are displaced radially and/or axially.

Figure 1:
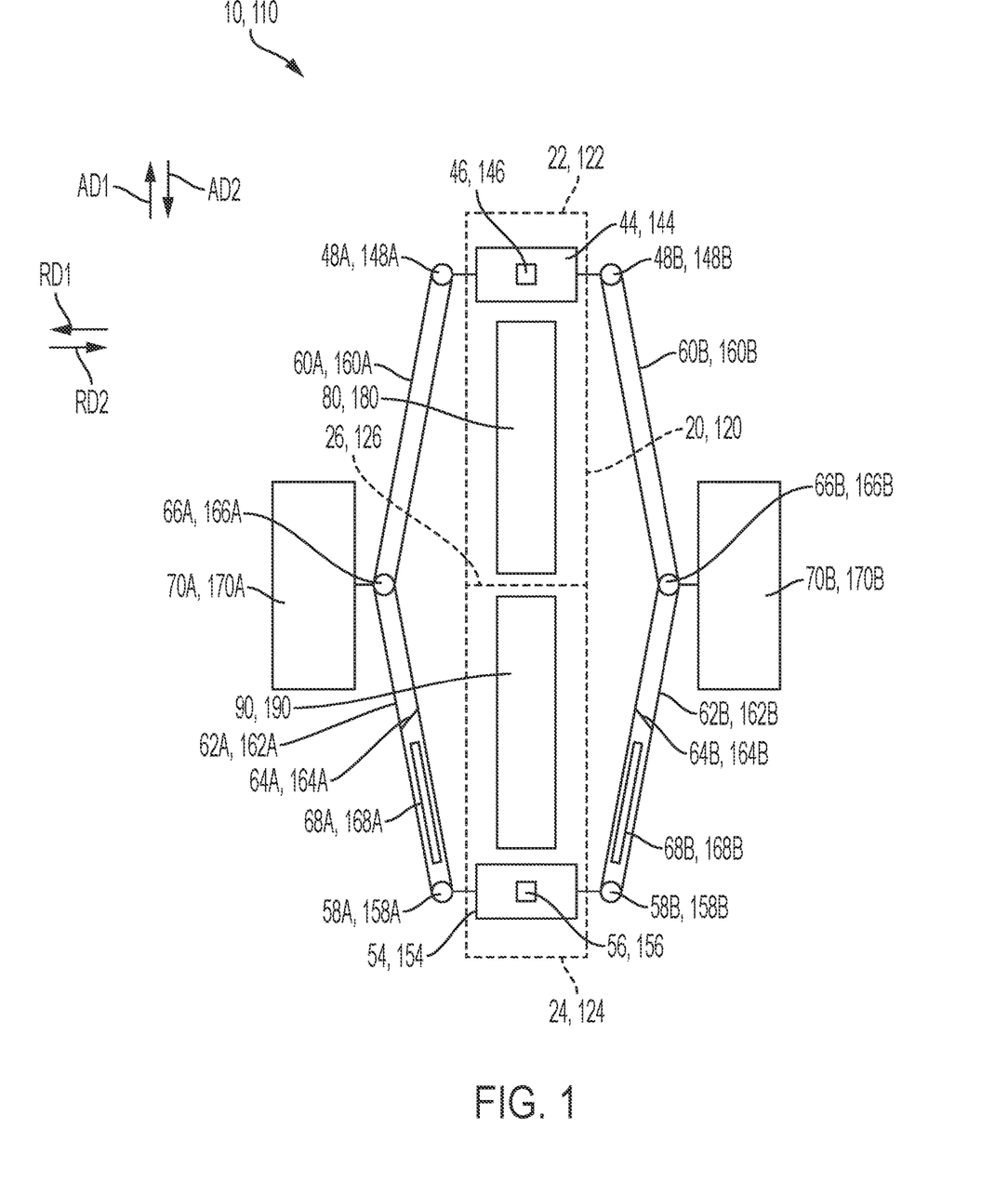
FIG. 1 is a schematic view of a flywheel assembly.
Figure 2:
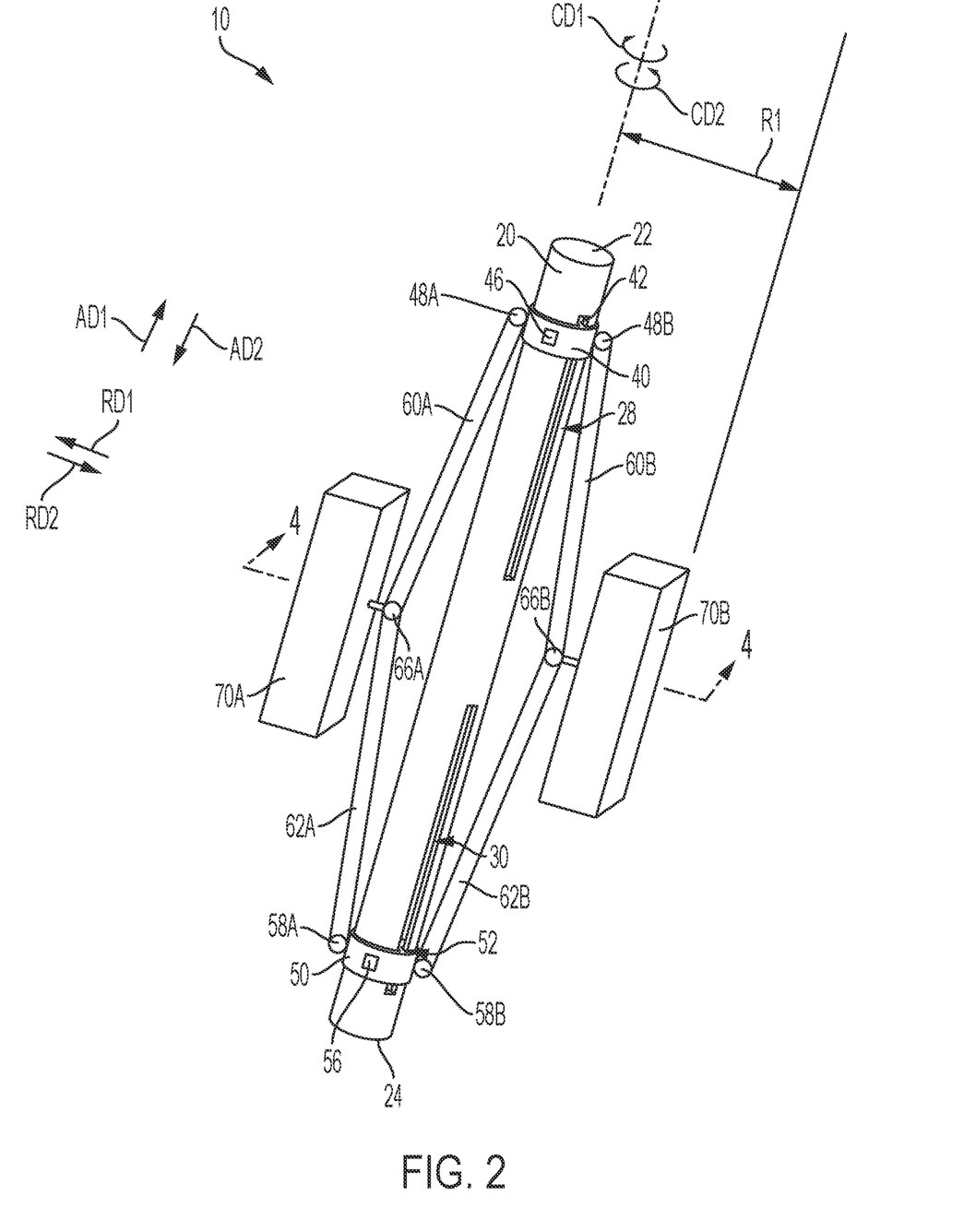
FIG. 2 is a perspective view of a flywheel assembly in a contracted state.
Figure 3:
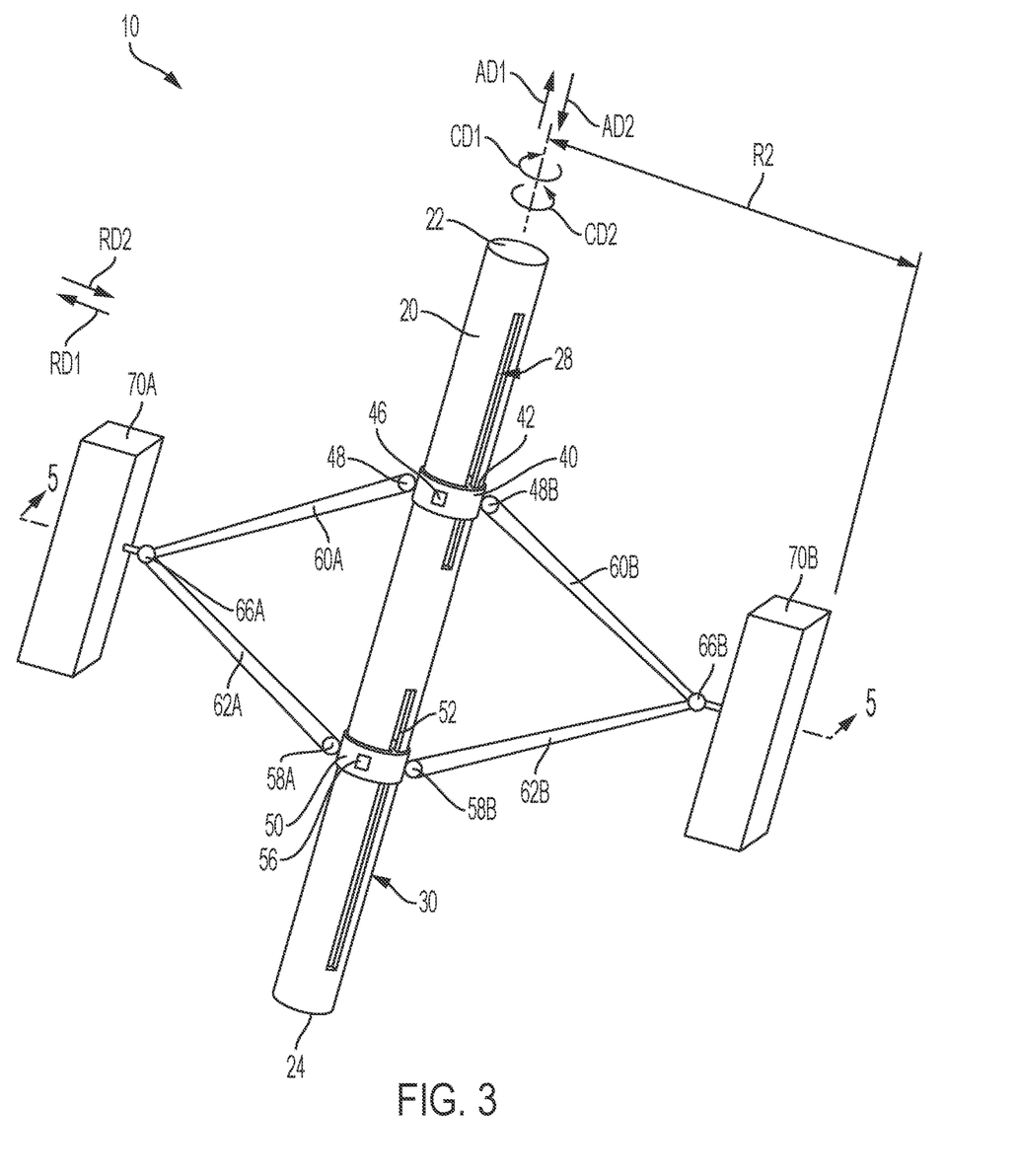
FIG. 3 is a perspective view of the flywheel assembly shown in FIG. 2 in an expanded state.
Figure 4:
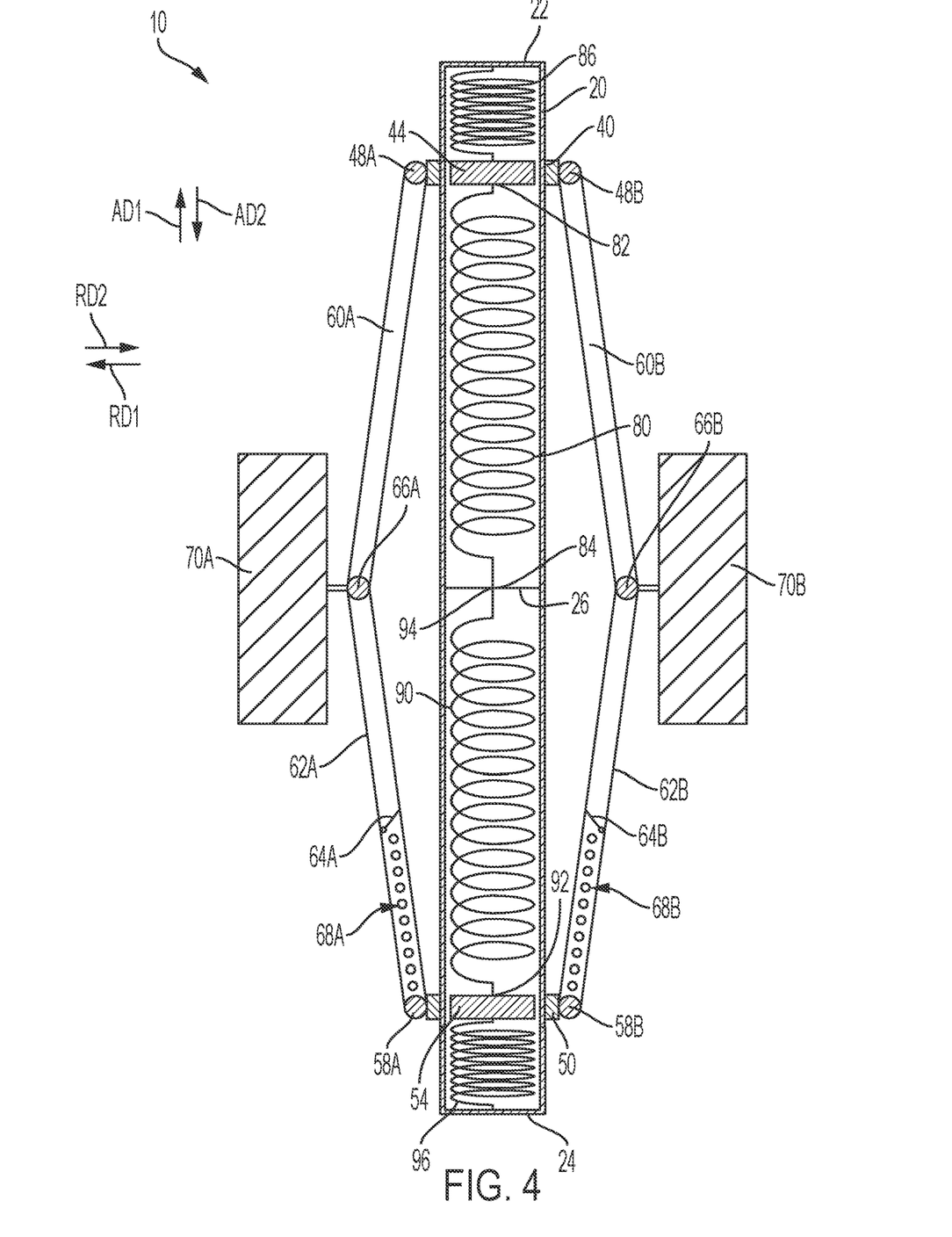
FIG. 4 is a cross-sectional view of the flywheel assembly taken generally along line 4-4 in FIG. 2.
Figure 5:
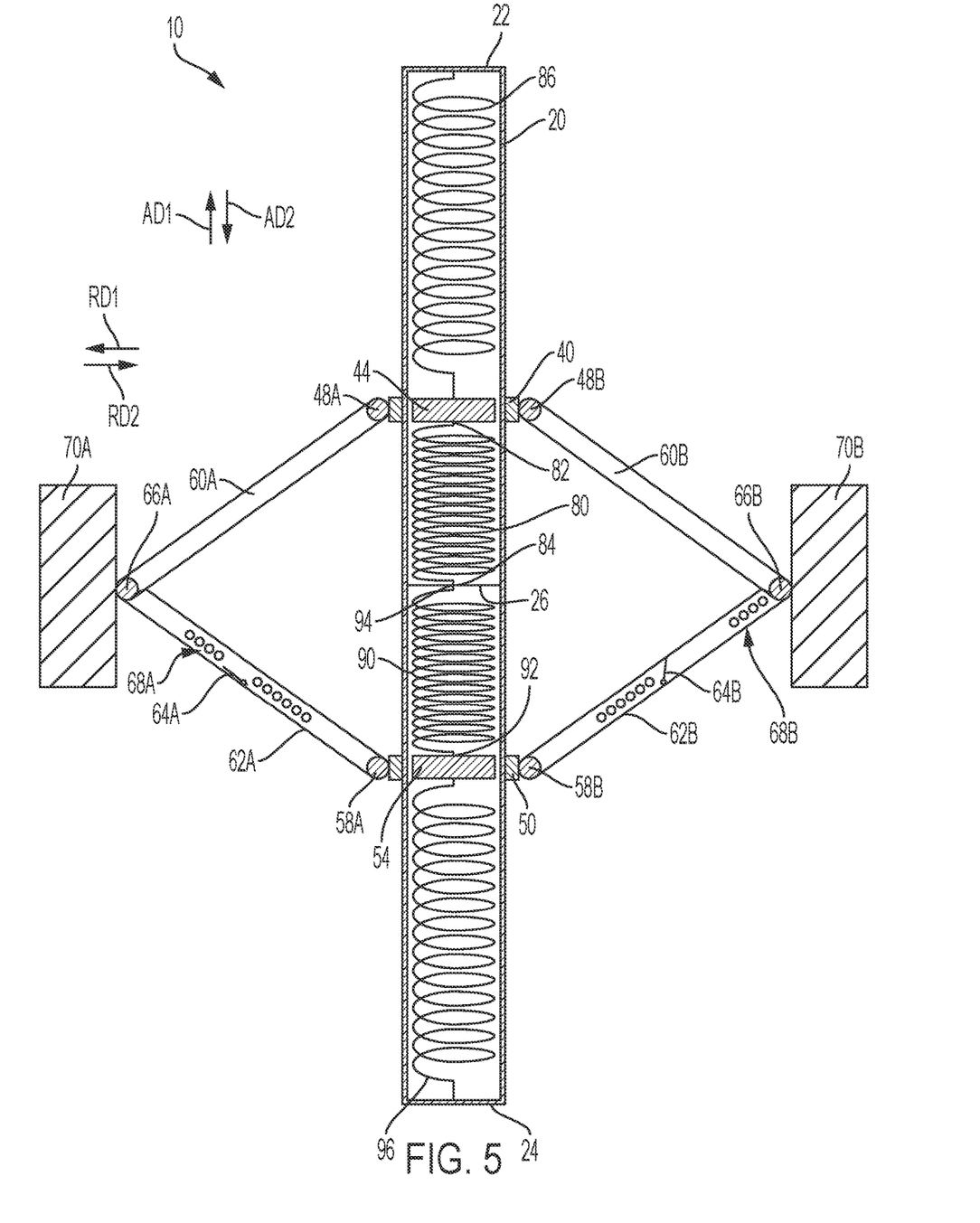
FIG. 5 is a cross-sectional view of the flywheel assembly taken generally along line 5-5 in FIG. 3.

Adverting now to the figures, FIG. 1 is a schematic view of flywheel assembly 10, 110. FIG. 2 is a perspective view of flywheel assembly 10 in a contracted state. FIG. 3 is a perspective view of flywheel assembly 10 in an expanded state. FIG. 4 is a cross-sectional view of flywheel assembly 10 taken generally along line 4-4 in FIG. 2. FIG. 5 is a cross-sectional view of flywheel assembly 10 taken generally along line 5-5 in FIG. 3. Flywheel assembly 10 generally comprises cylinder 20, at least one displaceable member, for example pistons 44 and 54, at least one resilient or biasing element, for example springs 80 and 90, at least one tube or arm, for example tubes or arms 60A-B and 62A-B, and at least one mass, for example masses 70A-B. The following description should be read in view of FIGS. 1-5.

Cylinder 20 is generally a hollow tube comprising end 22 and end 24. In some embodiments, end 22 and/or end 24 is closed with a cap or plate. In some embodiments, cylinder 20 comprises flange or partition 26. Flange 26 is arranged radially within cylinder 20 and axially between end 22 and end 24, for example, at a center point within cylinder 20. Cylinder 20 further comprises at least one slot, for example slots 28 and 30. Slot 28 is generally an aperture in cylinder 20 arranged proximate end 22. Slot 28 is operatively arranged to engage protrusion 42 of collar 40, as will be described in greater detail below. Slot 30 is generally an aperture in cylinder 20 arranged proximate end 24. Slot 30 is operatively arranged to engage protrusion 52 of collar 50, as will be described in greater detail below. In an example embodiment, cylinder 20 may be connected to a drive element, for example a crankshaft of an engine or a wave capture energy conversion device, storing rotational energy while torque is applied. When the torque is removed, flywheel assembly 10 can continue to apply torque to the drive shaft or a secondary shaft, from the stored rotation energy.

Collar 40 is non-rotatably connected to cylinder 20. Collar 40 generally comprises radially inward extending protrusion 42 and piston 44. Piston 44 is fixedly secured to collar 40 via protrusion 42. In some embodiments, collar 40 comprises a plurality of protrusions 42 that engage a plurality of slots 28 to fixedly secure piston 44 to collar 40. As best shown in FIGS. 4-5, collar 40, cylinder 20, and piston 44 are arranged concentrically. Collar 40 is slidable with respect to the radially outward facing surface of cylinder 20. Protrusion 42 extends radially inward from collar 40 through slot 28. Piston 44 is slidable with respect to the radially inward facing surface of cylinder 20. Collar 40 further comprises at least one pivot or hinge, for example, pivots 48A-B. Pivots 48A-B are operatively arranged to pivotably or hingedly connect tubes 60A-B to collar 40. In some embodiments, collar 40 further comprises clutch 46. Clutch 46 is operatively arranged to fixedly secure collar 40 to cylinder 20. For example, clutch 46 may comprise an actuator or element that engages a notch or teeth on cylinder 20. In another example, clutch 46 may comprise a clamping element that clamps collar 40 to cylinder 20. It should be appreciated that clutch 46 may comprise any means suitable to selectively fixedly secure collar 40 to cylinder 20. In some embodiments, clutch 46 is an electronic clutch controlled by a controller, for example, from a remote location (e.g., a computer).

Collar 50 is non-rotatably connected to cylinder 20. Collar 50 generally comprises radially inward extending protrusion 52 and piston 54. Piston 54 is fixedly secured to collar 50 via protrusion 52. In some embodiments, collar 50 comprises a plurality of protrusions 52 that engage a plurality of slots 30 to fixedly secure piston 54 to collar 50. As best shown in FIGS. 4-5, collar 50, cylinder 20, and piston 54 are arranged concentrically. Collar 50 is slidable with respect to the radially outward facing surface of cylinder 20. Protrusion 52 extends radially inward from collar 50 through slot 30. Piston 54 is slidable with respect to the radially inward facing surface of cylinder 20. Collar 50 further comprises at least one pivot or hinge, for example, pivots 58A-B. Pivots 58A-B are operatively arranged to pivotably or hingedly connect tubes 62A-B to collar 50. In some embodiments, collar 50 further comprises clutch 56. Clutch 56 is operatively arranged to fixedly secure collar 50 to cylinder 20. For example, clutch 56 may comprise an actuator or element that engages a notch or teeth on cylinder 20. In another example, clutch 56 may comprise a clamping element that clamps collar 50 to cylinder 20. It should be appreciated that clutch 56 may comprise any means suitable to selectively fixedly secure collar 50 to cylinder 50. In some embodiments, clutch 56 is an electronic clutch controlled by a controller, for example, from a remote location (e.g., a computer).

Mass 70A is pivotably connected to tubes 60A and 62A via pivot 66A. As cylinder 20, and thus collars 40 and 50, rotates in a circumferential direction, for example circumferential direction CD1 or circumferential direction CD2, mass 70A extends radially outward in radial direction RD1. Mass 70B is pivotably connected to tubes 60B and 62B via pivot 66B. As cylinder 20, and thus collars 40 and 50, rotates in a circumferential direction, for example circumferential direction CD1 or circumferential direction CD2, mass 70B extends radially outward in radial direction RD1. As such, as the rotational velocity of flywheel assembly 10 increases, so does it's overall radius. For example, FIG. 2 shows flywheel assembly 10 having radius R1 at rest or at a first rotational velocity. FIG. 3 shows flywheel assembly 10 having radius R2 at a second rotational velocity. Radius R2 is greater than radius R1 and the second rotational velocity is greater than the first rotational velocity. Increasing the radius of flywheel assembly 10 also increases its moment of inertia. As such, the radius of flywheel assembly 10 may be increased to decrease the rotational velocity of flywheel assembly 10. Likewise, the radius of flywheel assembly 10 may be decreased to increase the rotational velocity of flywheel assembly 10.

Spring 80 is arranged within cylinder 20 and comprises end 82 and end 84. End 82 is connected to piston 44 and end 84 is connected to flange 26. Spring 80 is operatively arranged to bias piston 44 in axial direction AD1 with respect to flange 26. As such, it can be said that spring 80 also biases masses 70A-B radially inward in radial direction RD2. FIG. 4 shows spring 80 in a generally relaxed state. As the rotational velocity of flywheel assembly 10 increases, as shown in FIG. 5, masses 70A-B expand radially outward in radial direction RD1 thereby displacing piston 44 in axial direction AD2 to compress spring 80. However, as the rotational velocity of flywheel assembly 10 decreases, spring 80 biases masses 70A-B radially inward to reduce the moment of inertia. In some embodiments, flywheel assembly 10 further comprises spring 86 which connects piston 44 to end 22. Similar to spring 80, spring 86 is operatively arranged to bias piston 44 in axial direction AD1 toward end 22.

Spring 90 is arranged within cylinder 20 and comprises end 92 and end 94. End 92 is connected to piston 54 and end 94 is connected to flange 26. Spring 90 is operatively arranged to bias piston 54 in axial direction AD2 with respect to flange 26. As such, it can be said that spring 90 also biases masses 70A-B radially inward in radial direction RD2. FIG. 4 shows spring 90 in a generally relaxed state. As the rotational velocity of flywheel assembly 10 increases, as shown in FIG. 5, masses 70A-B expand radially outward in radial direction RD1 thereby displacing piston 54 in axial direction AD1 to compress spring 90. However, as the rotational velocity of flywheel assembly 10 decreases, spring 90 biases masses 70A-B radially inward to reduce the moment of inertia. In some embodiments, flywheel assembly 10 further comprises spring 96 which connects piston 54 to end 24. Similar to spring 90, spring 96 is operatively arranged to bias piston 54 in axial direction AD2 toward end 24.

In some embodiments, at least one of tube 62A and tube 62B comprises displaceable material arranged therein and regulated by a valve. For example, tube 62A comprises a plurality of balls 68A arranged therein and regulated by valve 64A. Valve 64A may be controlled by a controller arranged at a remote location (i.e., a computer). As the rotational velocity of flywheel assembly 10 increases, it may be desired to transfer more mass to the outer perimeter. To do so, the controller sends a signal to valve 64A to open thereby allowing one or more balls 68A to displace therethrough toward mass 70A. Valve 68A is closed when a sufficient amount of mass has been transferred radially outward. As the rotational velocity of flywheel assembly 10 decreases and masses 70A-B displace back radially inward, tube 62A becomes more vertical and balls 68A may fall back down away from mass 70A (i.e., due to gravity). In some embodiments, balls 68A are made of tungsten. In some embodiments, fluid (e.g., mercury) is arranged in tube 68A instead of balls.

Tube 62B comprises a plurality of balls 68B arranged therein and regulated by valve 64B. Valve 64B may be controlled by a controller arranged at a remote location (i.e., a computer). As the rotational velocity of flywheel assembly 10 increases, it may be desired to transfer more mass to the outer perimeter. To do so, the controller sends a signal to valve 64B to open thereby allowing one or more balls 68B to displace therethrough toward mass 70B. Valve 68B is closed when a sufficient amount of mass has been transferred radially outward. As the rotational velocity of flywheel assembly 10 decreases and masses 70A-B displace back radially inward, tube 62B becomes more vertical and balls 68B may fall back down away from mass 70B (i.e., due to gravity). In some embodiments, balls 68B are made of tungsten. In some embodiments, fluid (e.g., mercury) is arranged in tube 68B instead of balls.

Since clutches 46 and 56 and valves 64A-B can be controlled remotely, the radius and mass distribution of flywheel assembly 10 can be controlled to optimize the moment of inertia. For example, when the drive element connected to flywheel assembly 10 is operating at a high rotational velocity, it may be desirable to increase the diameter of flywheel assembly 10 in order to maintain a rotational velocity (i.e., lower the RPM) therein. When the drive element stops, the flywheel assembly 10 continues to rotate but loses energy over time. Thus, at that point it is desirable to decrease the diameter of flywheel assembly 10 in order to maintain a rotational velocity (i.e., increase the RPM) therein.

It should be appreciated that flywheel assembly 10 may comprises one or more transducers in order to operate clutches 46 and 56 and valves 64A-B remotely via a controller. For example, each of valve 64A and valve 64B comprises a transducer operatively arranged to receive a signal from the controller and then open and close the valve (e.g., via an actuator). Likewise, each of clutches 46 and 56 comprises a transducer operatively arranged to receive a signal from the controller and then lock collars 40 and 50 to and unlock collars 40 and 50 from cylinder 20 (e.g., via an actuator).

Figure 6:
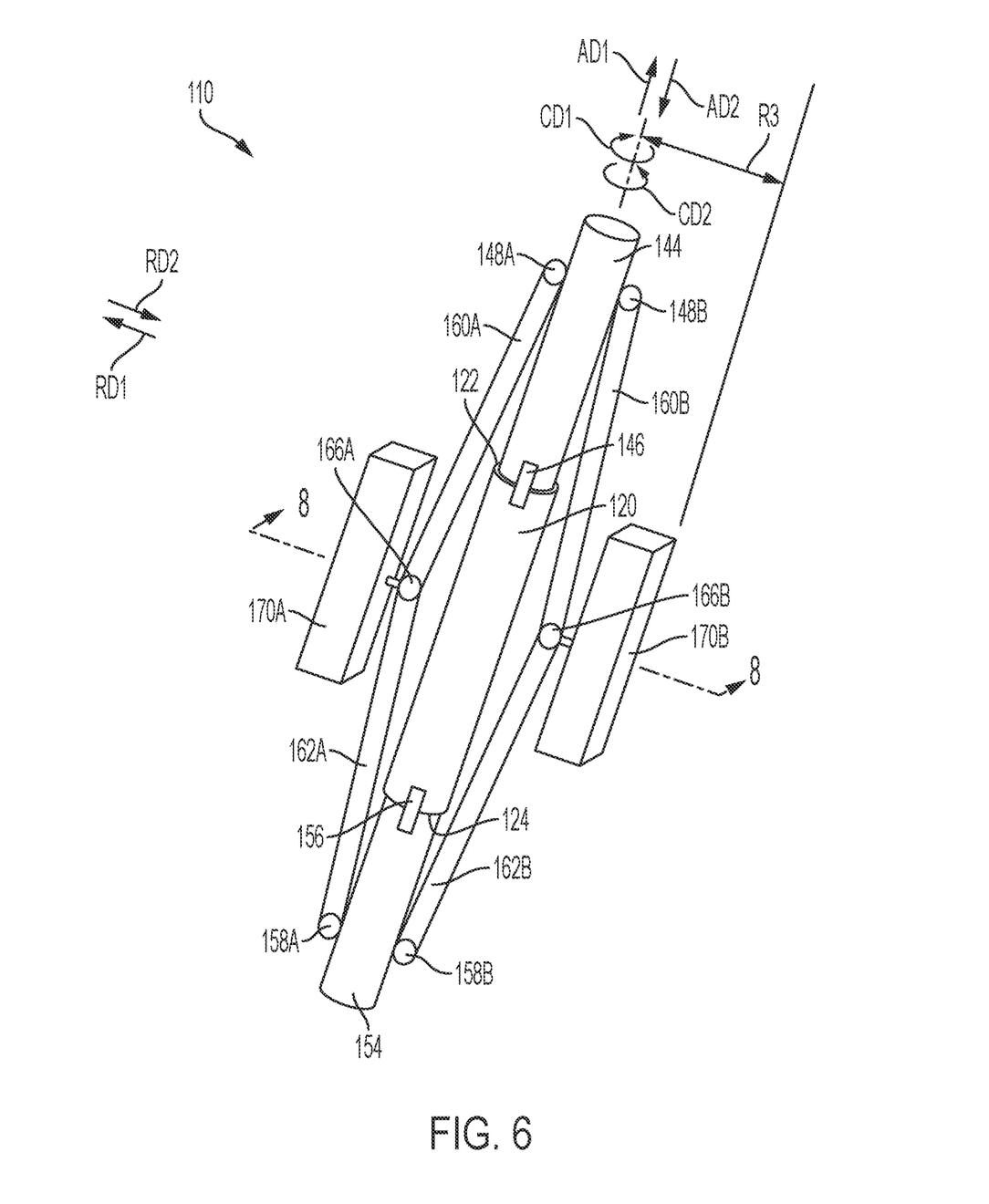
FIG. 6 is a perspective view of a flywheel assembly in a contracted state.
Figure 7:
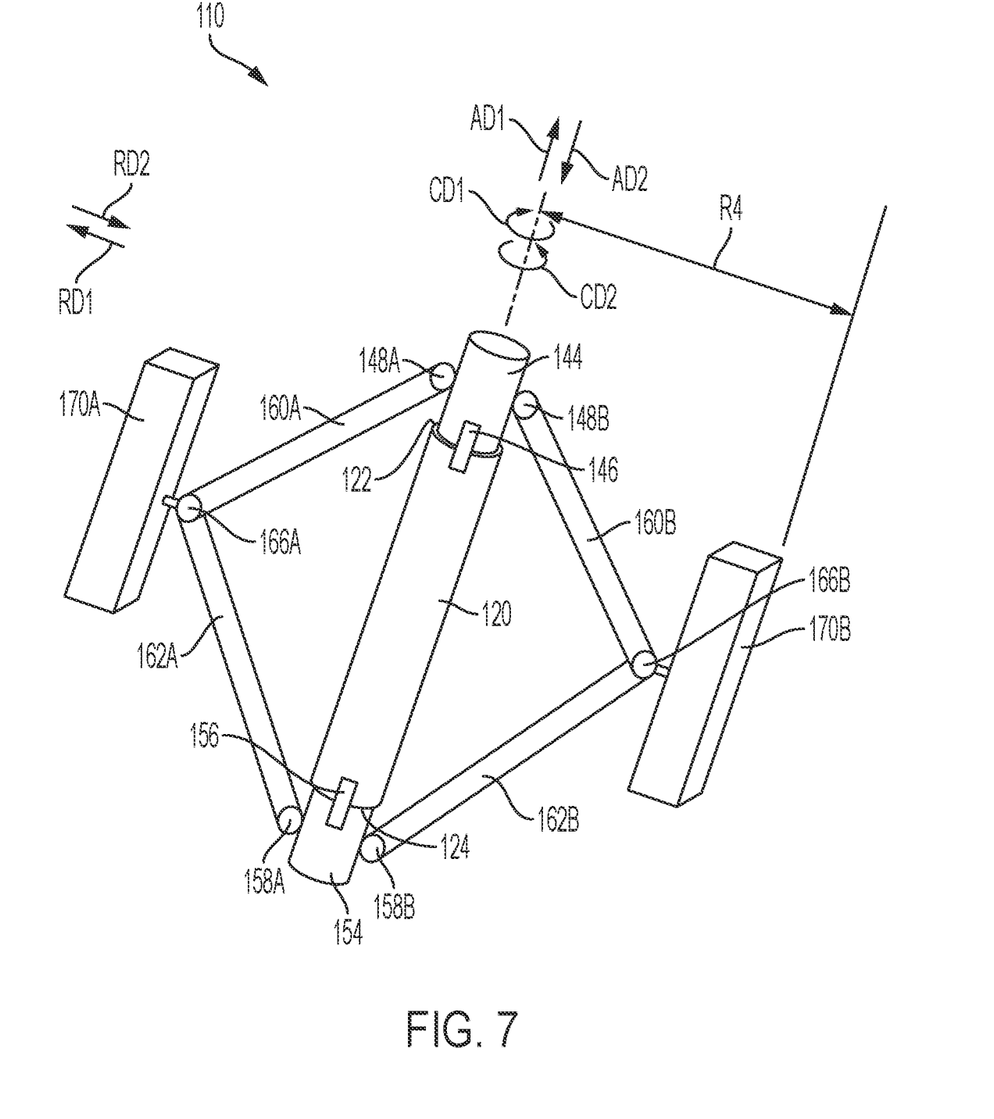
FIG. 7 is a perspective view of the flywheel assembly shown in FIG. 6 in an expanded state; and, FIG. 8 is a cross-sectional view of the flywheel assembly taken generally along line 8-8 in FIG. 6.
Figure 8:
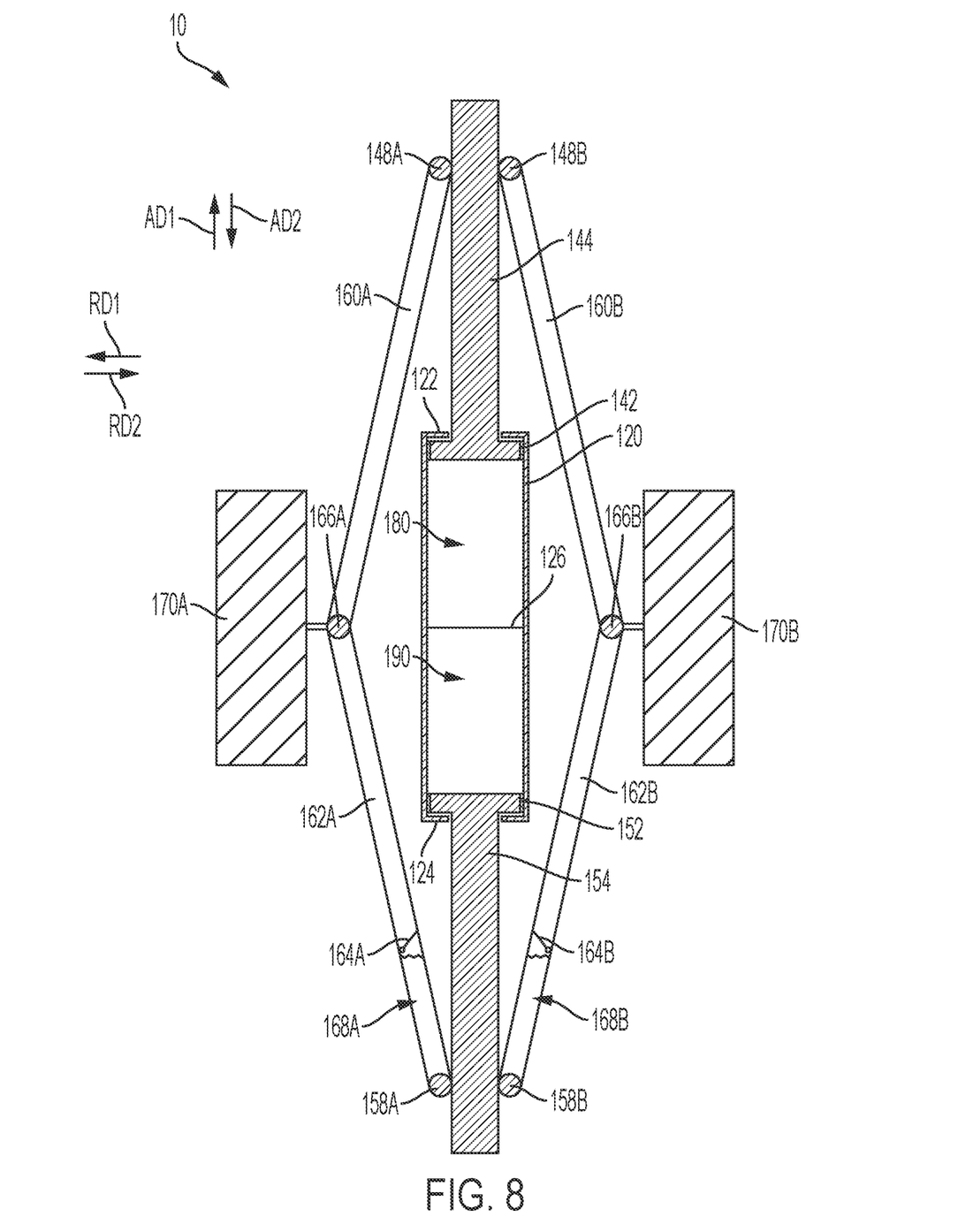

FIG. 6 is a perspective view of flywheel assembly 110 in a contracted state. FIG. 7 is a perspective view of flywheel assembly 110 in an expanded state. FIG. 8 is a cross-sectional view of flywheel assembly 110 taken generally along line 8-8 in FIG. 6. Flywheel assembly 110 generally comprises cylinder 120, at least one displaceable member, for example pistons 144 and 154, at least one resilient or biasing element, for example gas 180 and gas 190, at least one tube or arm, for example tubes or arms 160A-B and 162A-B, and at least one mass, for example masses 170A-B. The following description should be read in view of FIGS. 1 and 6-8.

Cylinder 120 is generally a hollow tube comprising end 122 and end 124. In some embodiments, cylinder 120 comprises flange or partition 126. Partition 126 is arranged radially within cylinder 120 and axially between end 122 and end 124, for example, at a center point within cylinder 120. In an example embodiment, cylinder 120 may be connected to a drive element, for example a crankshaft of an engine or a wave capture energy conversion device, storing rotational energy while torque is applied. When the torque is removed, flywheel assembly 110 can continue to apply torque to the drive shaft or a secondary shaft, from the stored rotation energy.

Piston 144 is non-rotatably connected to cylinder 120 (e.g., via a keyed engagement therebetween). Piston 144 is sealingly engaged with the radially inward facing surface of cylinder 120 via seal 142 (see FIG. 8). Piston 144 is slidable with respect to the radially inward facing surface of cylinder 120. Piston 144 further comprises at least one pivot or hinge, for example, pivots 148A-B. Pivots 148A-B are operatively arranged to pivotably or hingedly connect tubes 160A-B to piston 144. In some embodiments, flywheel assembly 110 further comprises clutch 146. Clutch 146 is operatively arranged to fixedly secure piston 140 to cylinder 120. For example, clutch 146 may comprise an actuator or element that engages a notch or teeth on piston 144. In another example, clutch 146 may comprise a clamping element that clamps piston 144 to cylinder 120. It should be appreciated that clutch 146 may comprise any means suitable to selectively fixedly secure piston 144 to cylinder 120. In some embodiments, clutch 146 is an electronic clutch controlled by a controller, for example, from a remote location (e.g., a computer).

Piston 154 is non-rotatably connected to cylinder 120 (e.g., via a keyed engagement therebetween). Piston 154 is sealingly engaged with the radially inward facing surface of cylinder 120 via seal 152 (see FIG. 8). Piston 154 is slidable with respect to the radially inward facing surface of cylinder 120. Piston 154 further comprises at least one pivot or hinge, for example, pivots 158A-B. Pivots 158A-B are operatively arranged to pivotably or hingedly connect tubes 162A-B to piston 154. In some embodiments, flywheel assembly 110 further comprises clutch 156. Clutch 156 is operatively arranged to fixedly secure piston 150 to cylinder 120. For example, clutch 156 may comprise an actuator or element that engages a notch or teeth on piston 154. In another example, clutch 156 may comprise a clamping element that clamps piston 154 to cylinder 120. It should be appreciated that clutch 156 may comprise any means suitable to selectively fixedly secure piston 154 to cylinder 120. In some embodiments, clutch 156 is an electronic clutch controlled by a controller, for example, from a remote location (e.g., a computer).

Mass 170A is pivotably connected to tubes 160A and 162A via pivot 166A. As cylinder 120, and thus pistons 144 and 154, rotates in a circumferential direction, for example circumferential direction CD1 or circumferential direction CD2, mass 170A extends radially outward in radial direction RD1. Mass 170B is pivotably connected to tubes 160B and 162B via pivot 166B. As cylinder 120, and thus pistons 144 and 154, rotates in a circumferential direction, for example circumferential direction CD1 or circumferential direction CD2, mass 170B extends radially outward in radial direction RD1. As such, as the rotational velocity of flywheel assembly 110 increases, so does its overall radius. For example, FIG. 6 shows flywheel assembly 110 having radius R3 at rest or at a first rotational velocity. FIG. 7 shows flywheel assembly 110 having radius R4 at a second rotational velocity. Radius R4 is greater than radius R3 and the second rotational velocity is greater than the first rotational velocity. Increasing the radius of flywheel assembly 110 also increases its moment of inertia. As such, the radius of flywheel assembly 110 may be increased to decrease the rotational velocity of flywheel assembly 110. Likewise, the radius of flywheel assembly 110 may be decreased to increase the rotational velocity of flywheel assembly 110.

Gas 180 is arranged within cylinder 120 and is operatively arranged to bias piston 144 in axial direction AD1 with respect to partition 126. As such, it can be said that gas 180 also biases masses 170A-B radially inward in radial direction RD2. FIG. 8 shows gas 180 in a generally uncompressed state. As the rotational velocity of flywheel assembly 110 increases, as shown in FIG. 7, masses 170A-B expand radially outward in radial direction RD1 thereby displacing piston 144 in axial direction AD2 to compress gas 180. However, as the rotational velocity of flywheel assembly 110 decreases, gas 180 biases masses 170A-B radially inward to reduce the moment of inertia.

Gas 190 is arranged within cylinder 120 and is operatively arranged to bias piston 154 in axial direction AD2 with respect to partition 126. As such, it can be said that gas 190 also biases masses 170A-B radially inward in radial direction RD2. FIG. 8 shows gas 190 in a generally uncompressed state. As the rotational velocity of flywheel assembly 110 increases, as shown in FIG. 7, masses 170A-B expand radially outward in radial direction RD1 thereby displacing piston 154 in axial direction AD1 to compress gas 190. However, as the rotational velocity of flywheel assembly 110 decreases, gas 190 biases masses 170A-B radially inward to reduce the moment of inertia.

In some embodiments, at least one of tube 162A and tube 162B comprises displaceable material arranged therein and regulated by a valve. For example, tube 162A comprises a liquid 168A arranged therein and regulated by valve 164A. Valve 164A may be controlled by a controller arranged at a remote location (i.e., a computer). As the rotational velocity of flywheel assembly 110 increases, it may be desired to transfer more mass to the outer perimeter. To do so, the controller sends a signal to valve 164A to open thereby allowing liquid 168A to displace therethrough toward mass 170A. Valve 168A is closed when a sufficient amount of mass has been transferred radially outward. As the rotational velocity of flywheel assembly 110 decreases and masses 170A-B displace back radially inward, tube 162A becomes more vertical and liquid 168A may fall back down away from mass 170A (i.e., due to gravity). In some embodiments, liquid 168A comprises mercury. In some embodiments, balls are arranged in tube 168A instead of fluid.

Tube 162B comprises a liquid 168B arranged therein and regulated by valve 164B. Valve 164B may be controlled by a controller arranged at a remote location (i.e., a computer). As the rotational velocity of flywheel assembly 110 increases, it may be desired to transfer more mass to the outer perimeter. To do so, the controller sends a signal to valve 164B to open thereby allowing liquid 168B to displace therethrough toward mass 170B. Valve 168B is closed when a sufficient amount of mass has been transferred radially outward. As the rotational velocity of flywheel assembly 110 decreases and masses 170A-B displace back radially inward, tube 162B becomes more vertical and liquid 168B may fall back down away from mass 170B (i.e., due to gravity). In some embodiments, liquid 168B comprises mercury. In some embodiments, balls are arranged in tube 168B instead of fluid.

Since clutches 146 and 156 and valves 164A-B can be controlled remotely, the radius and mass distribution of flywheel assembly 110 can be controlled to optimize the moment of inertia. For example, when the drive element connected to flywheel assembly 110 is operating at a high rotational velocity, it may be desirable to increase the diameter of flywheel assembly 110 in order to maintain a rotational velocity (i.e., lower the RPM) therein. When the drive element stops, the flywheel assembly 110 continues to rotate but loses energy over time. Thus, at that point it is desirable to decrease the diameter of flywheel assembly 10 in order to maintain a rotational velocity (i.e., increase the RPM) therein.

It should be appreciated that flywheel assembly 110 may comprises one or more transducers in order to operate clutches 146 and 156 and valves 164A-B remotely via a controller. For example, each of valve 164A and valve 164B comprises a transducer operatively arranged to receive a signal from the controller and then open and close the valve (e.g., via an actuator). Likewise, each of clutches 146 and 146 comprises a transducer operatively arranged to receive a signal from the controller and then lock collars 140 and 150 to and unlock collars 140 and 150 from cylinder 120 (e.g., via an actuator).

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Flywheel assembly
20 Cylinder
22 End
24 End
26 Flange or partition
28 Slot or slots
30 Slot or slots
40 Collar
42 Protrusion or protrusions
44 Piston
46 Clutch
48A Pivot or hinge
48B Pivot or hinge
50 Collar
52 Protrusion or protrusions
54 Piston
56 Clutch
58A Pivot or hinge
58B Pivot or hinge
60A Tube or arm
60B Tube or arm
62A Tube or arm
62B Tube or arm
64A Valve or gate
64B Valve or gate
66A Pivot or hinge
66B Pivot or hinge
68A Displaceable material, balls, or fluid
68B Displaceable material, balls, or fluid 70A Mass
70B Mass
80 Spring
82 End
84 End
86 Spring
90 Spring
92 End
94 End
96 Spring
110 Flywheel assembly
120 Cylinder
122 End
124 End
126 Flange or partition
142 Seal
144 Piston
146 Clutch
148A Pivot or hinge
148B Pivot or hinge
152 Seal
154 Piston
156 Clutch
158A Pivot or hinge
158B Pivot or hinge
160A Tube or arm
160B Tube or arm
162A Tube or arm
162B Tube or arm
164A Valve or gate
164B Valve or gate
166A Pivot or hinge
166B Pivot or hinge
168A Displaceable material, balls, or fluid
168B Displaceable material, balls, or fluid
170A Mass
170B Mass
180 Chamber/gas
190 Chamber/gas
AD1 Axial direction
AD2 Axial direction
CD1 Circumferential direction
CD2 Circumferential direction
R1 Radius
R2 Radius
R3 Radius
R4 Radius
RD1 Radial direction
RD2 Radial direction

What is claimed is:

1. A flywheel assembly, comprising:
a cylinder including a first end and a second end;
a first piston non-rotatably connected to the cylinder, the first piston being slidably engaged in the cylinder proximate the first end;
a first biasing element operatively arranged in the cylinder to bias the first piston in a first axial direction;
a first arm non-rotatably connected to the first piston about an axis of the cylinder;
a second arm non-rotatably connected to the first piston about the axis of the cylinder;
a first mass connected to the first arm; and,
a second mass connected to the second arm.

2. The flywheel assembly as recited in claim 1, wherein the first arm and the second arm are pivotably connected to the first piston.

3. The flywheel assembly as recited in claim 2, wherein the first arm is pivotably connected to the first mass and the second arm is pivotably connected to the second mass.

4. The flywheel assembly as recited in claim 1, wherein as the first mass and the second mass are displaced radially outward, the first piston displaces in a second axial direction, opposite the first axial direction.

5. The flywheel assembly as recited in claim 1, wherein the first biasing element is a spring.

6. The flywheel assembly as recited in claim 1, wherein the first biasing element is gas, the gas being pressurized within the cylinder by the first piston.

7. The flywheel assembly as recited in claim 1, further comprising a first clutch operatively arranged to lock the first piston with respect to the cylinder.

8. The flywheel assembly as recited in claim 1, further comprising:
a second piston non-rotatably connected to the cylinder, the second piston being slidably engaged in the cylinder proximate the second end;
a second biasing element operatively arranged in the cylinder to bias the second piston in a second axial direction, opposite the first axial direction;
a third arm non-rotatably connected to the second piston about the axis of the cylinder, the third arm connected to first mass; and,
a fourth arm non-rotatably connected to the second piston about the axis of the cylinder, the fourth arm connected to the second mass.

9. The flywheel assembly as recited in claim 1, wherein at least one of the first arm and the second arm comprises a displaceable mass therein.

10. The flywheel assembly as recited in claim 9, wherein the at least one of the first arm and the second arm comprises a valve operatively arranged to regulate the movement of the displaceable mass.

11. The flywheel assembly as recited in claim 10, wherein the displaceable mass is a liquid.

12. The flywheel assembly as recited in claim 10, wherein the displaceable mass is a plurality of solid balls.

13. A flywheel assembly, comprising:
a cylinder including a first end and a second end;
a first piston non-rotatably connected to the cylinder, the first piston being slidably engaged in the cylinder proximate the first end;
a second piston non-rotatably connected to the cylinder, the second piston being slidably engaged in the cylinder proximate the second end;
a first biasing element operatively arranged in the cylinder to bias the first piston in a first axial direction;
a second biasing element operatively arranged in the cylinder to bias the second piston in a second axial direction, opposite the first axial direction;
a first arm non-rotatably connected to the first piston about an axis of the cylinder and the first mass;
a second arm non-rotatably connected to the first piston about the axis of the cylinder and the second mass;
a third arm non-rotatably connected to the second piston about the axis of the cylinder and the first mass; and,
a fourth arm non-rotatably connected to the second piston about the axis of the cylinder and the second mass.

14. The flywheel assembly as recited in claim 13, wherein:
the first arm and the second arm are pivotably connected to the first piston; and,
the third arm and the fourth arm are pivotably connected to the second piston.

15. The flywheel assembly as recited in claim 13, wherein as the first mass and the second mass are displaced radially outward, the first piston displaces in the second axial direction and the second piston displaces in the first axial direction.

16. The flywheel assembly as recited in claim 13, wherein at least one of the first biasing element and the second biasing element comprises at least one spring.

17. The flywheel assembly as recited in claim 13, wherein at least one of the first biasing element and the second biasing element is gas, the gas being pressurized within the cylinder.

18. The flywheel assembly as recited in claim 13, further comprising at least one clutch operatively arranged to lock at least one of the first piston and the second piston with respect to the cylinder.

19. The flywheel assembly as recited in claim 13, wherein at least one of the third arm and the fourth arm comprises:
   a tube;
   a displaceable mass arranged in the tube; and,
   a valve operatively arranged in the tube to regulate the movement of the displaceable mass.

20. The flywheel assembly as recited claim 19, wherein the displaceable mass is selected from the group consisting of a liquid and a plurality of solid balls.

\* \* \* \* \*